July 29, 1958 G. T. SENSENEY ET AL 2,845,514
PRESSURE-OPERATED RHEOSTAT
Filed Nov. 29, 1955 3 Sheets-Sheet 3

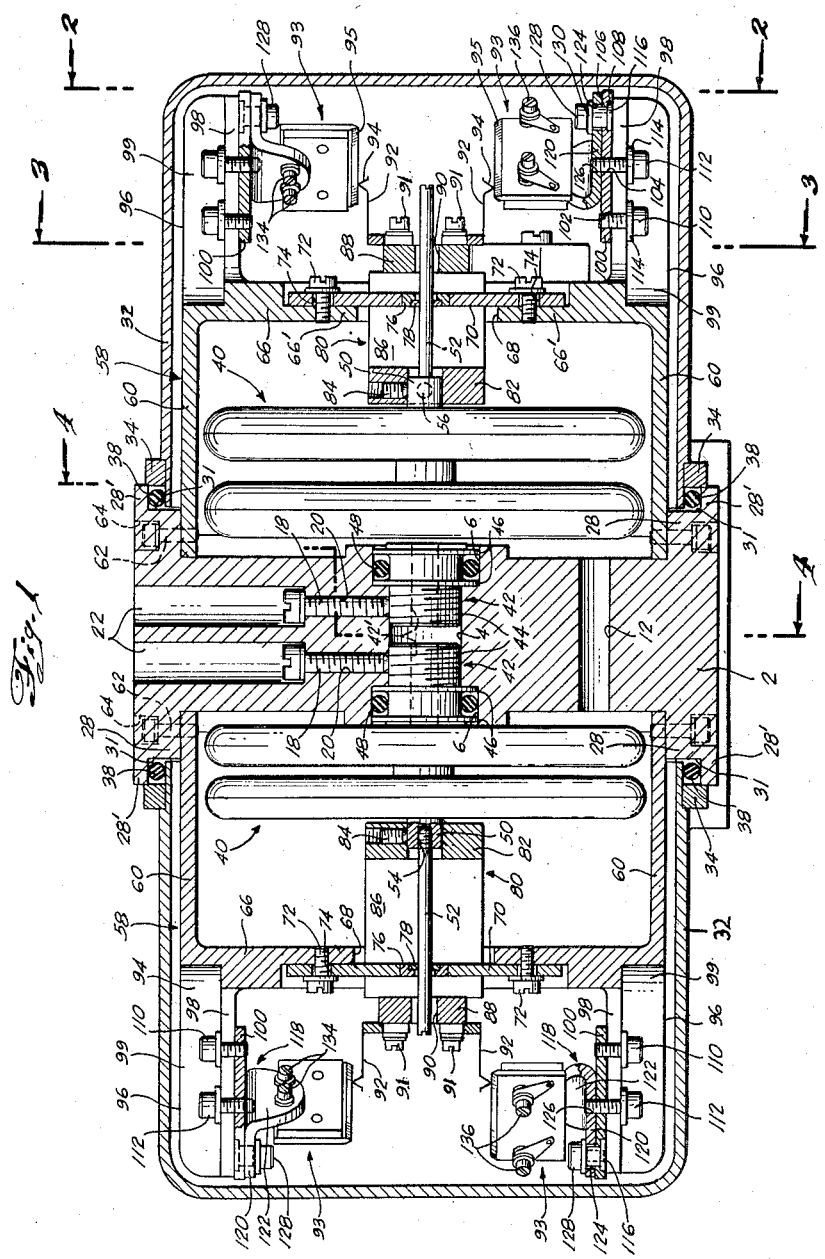

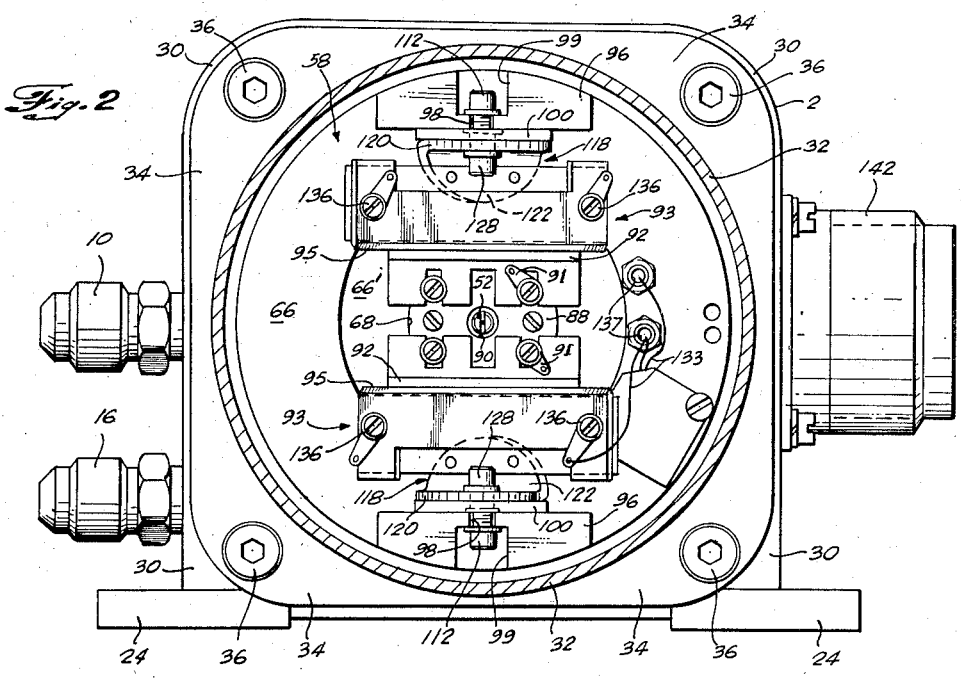
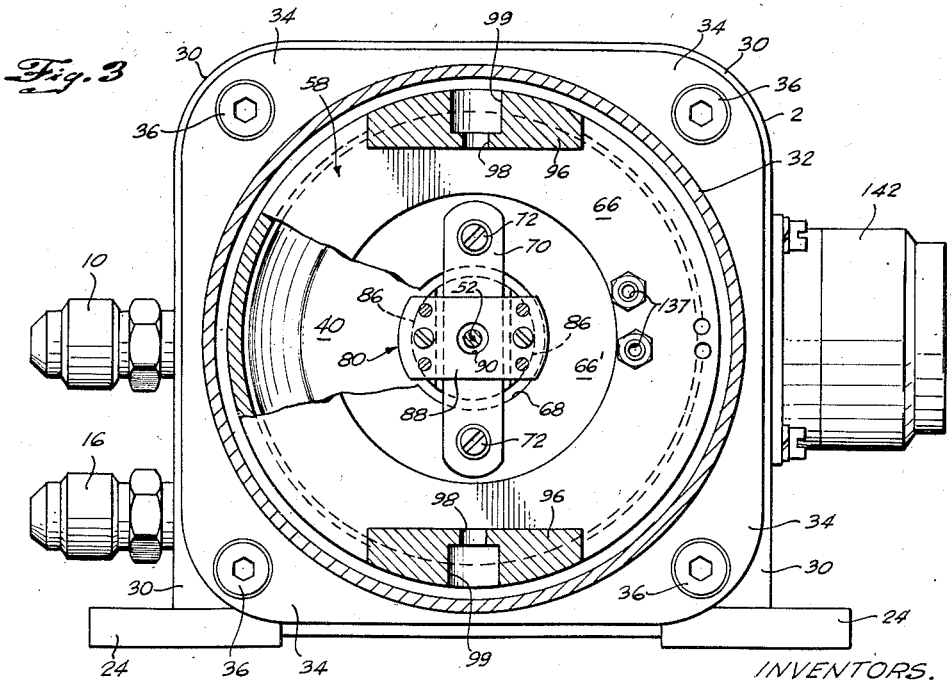

INVENTORS.
GEORGE T. SENSENEY
FREDERICK H. SYLVESTER
BY James and Franklin
ATTORNEYS.

United States Patent Office 2,845,514
Patented July 29, 1958

2,845,514

PRESSURE-OPERATED RHEOSTAT

George T. Senseney, New York, and Frederick H. Sylvester, Baldwin, N. Y., assignors to Rahm Instruments Inc., New York, N. Y., a corporation of New York Application November 29, 1955, Serial No. 549,598

16 Claims. (Cl. 201—48)

The present invention relates to a novel construction for a pressure-actuated indicating instrument, and particularly one capable of heavy duty use.

Pressure transducers measure pressure or pressure differential and translate that measurement into a variable output which is usually electrical in nature and bears some predetermined relation to the measured pressure. Among their most important fields of use are the measurement of altitude, air speed and the like in jet aircraft and guided missiles. The variable electrical output can be used within the aircraft, for example, to actuate an indicating instrument, or the output can be directly or indirectly transmitted to some remote station, i. e. telemetered.

Instruments of this type, when used in such applications, are subject to exceptionally adverse operating conditions. Vibration, shock, acceleration, operating temperatures and the like are all extreme. Nevertheless a high degree of accuracy is required, whether to aid in the navigation of the aircraft in which they may be installed, to serve as inputs into gun or bombsights or to transmit intelligence to ground stations.

The structure of the present invention is specially designed so as to satisfy the above requirements. In particular, the member which actually detects the pressure or pressure differential and which is movable in response thereto is so supported and mounted as to be affected by vibration, acceleration or shock only to a minimal degree. This is accomplished by means of a simple and comparatively inexpensive structural arrangement which need not be manufactured to particularly close tolerances and which is very readily constructed and assembled. The movable portion of the measuring member is provided with an element which extends therefrom in the direction in which the member moves, and that element is snugly but freely slidably received by a fixed guide so that its position is fixed except in the direction in which movement is desired. The other end of the member is fixed to the base of the instrument, and consequently the member is reliably supported. The member carries a yoke which extends around the fixed guide. The yoke carries means for indicating its position relative to the base, and consequently indicating the pressure or pressure differential which is measured by the member.

This indicating means, when the output from the instrument is to be an electrical quantity, may comprise one or more control elements operatively engageable with and movable with respect to one or more electrical components mounted on the base. These components may take the form of resistance windings in which case the control elements comprise brushes. Appropriate electrical connections are made to the windings and to the brushes so that they may constitute potentiometers or variable resistances. The electrical components may be secured to the base of the instrument by the same unitary structure which supports the guide for the member-carried element. When a plurality of components and control elements are employed, it is preferred that they be equally angularly distributed about the axis of the member-carried element, and consequently equally angularly distributed about the direction of movement of the movable parts. This sets up a balance of forces which tends to further stabilize the instrument and render it even more resistant to the effects of vibration, acceleration and shock.

In order to calibrate the outputs of the electrical components, both as to magnitude for any given position of the control elements (zero position) and proportionately to a given degree of movement of the control elements (rate), the components must be adjustably mounted with respect to those control elements. A novel form of mounting is here disclosed utilizing but three adjustable members, usually in the form of screws, by means of which zero position and rate can be independently varied. Adjustment of zero position involves the loosening of the first and second screws, and adjustment of rate involves the loosening of the second and third screws. The arrangement is such that the second screw constitutes the axis about which the electrical component pivots for rate adjustment, that axis preferably lying in the plane of the surface of the electrical component engaged by the control element.

The instrument of the present invention is constructed from a comparatively small number of parts, each readily fabricatable, and the parts are readily assemblable on a production line basis. As a result a comparatively inexpensive instrument is produced the output of which satisfactorily meets rigorous requirements of accuracy even under the most adverse operating conditions.

To the accomplishment of the above, and to such other objects as may hereinafter appear, the present invention relates to the structure of a pressure transducer as defined in the appended claims and as described in this specification, taken together with the accompanying drawings, in which:

Fig. 1 is a cross sectional view of one embodiment of the present invention;

Fig. 2 is a cross sectional view taken along the line 2—2 of Fig. 1;

Fig. 3 is a cross sectional view, partially broken away, taken along the line 3—3 of Fig. 2;

Figure 4:
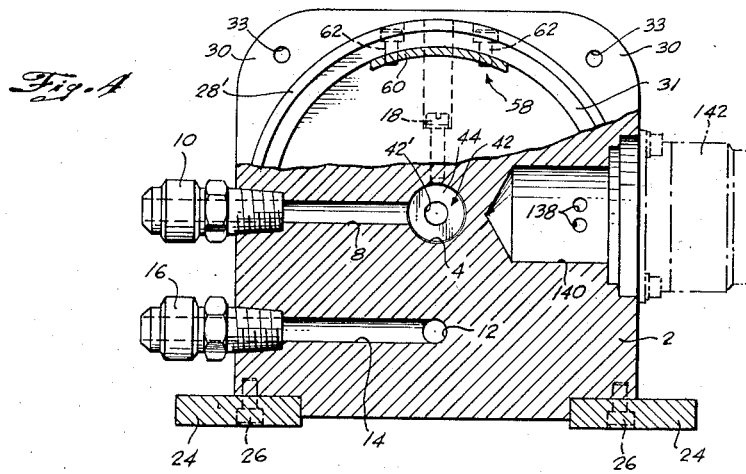
Fig. 4 is a cross sectional view of the instrument base taken along the line 4—4 of Fig. 1.
Figures 5, 6, 7:
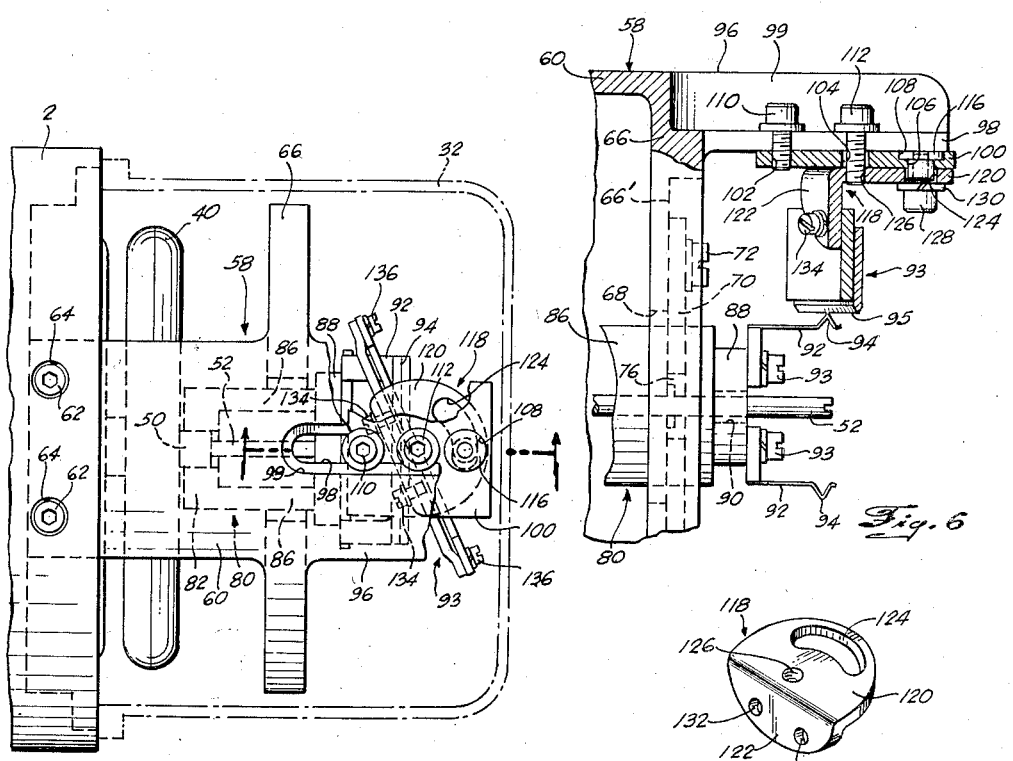
Fig. 5 is a side elevational view, partially broken away, of one portion of the instrument and partially showing the manner in which one of the electrical components is adjustably mounted.
Fig. 6 is a cross sectional view taken along the line 6—6 of Fig. 5.
Fig. 7 is a three-quarter perspective view of the bracket to which the electrical component is adapted to be secured.

The invention is here disclosed as embodied in a dual type instrument, that is to say, one in which two pressure detecting members are employed, but it will be appreciated that this is in no way essential to the operation of the instrument nor to the inventive features hereinafter to be described. The base 2, which may be in the form of an aluminum casting, is provided with a central aperture 4 extending therethrough, the ends of the aperture 4 being countersunk at 6 and the body of the aperture 4 being internally threaded adjacent the countersinks 6. A lateral passage 8 extends from one side of the base 2 to the aperture 4 and communicates therewith, a pressure fitting 10 being received in the outer end of the passage 8. A second aperture 12 extends through the base 10 from one end thereof to the other, and a passage 14 communicates between the aperture 12 and a side of the base 2, a pressure fitting 16 being received in the outer end of the passage 14. A pair of set screws 18 enter the aperture 4 via internally threaded passages 20, the heads of the screw 18 being received within elongated countersinks 22 extending to a side of the base 2. Feet 24 may be secured to the base 2 by means of screws 26, the feet being available for mounting purposes.

At each end the base 2 is provided with a rim 28 which is substantially circular in contour, although, as may be seen from Figs. 2–4, the base itself is substantially square in cross section, thus defining flat corner portions 30 which are provided with internally threaded apertures 33 (see Fig. 4). The rim 28 is provided with ends 28' of reduced thickness, thus defining ledges 31. Sealing cans 32 are adapted to be mounted on the base 2 so as to cover and seal the operative parts of the instrument to be described below, the cans 32 having flanges 34 which extend over the corner portions 30 of the base 2 and are secured thereto by means of screws 36 which enter the base apertures 33. The flanges 34 may be defined by a ring separate from the can 32 itself and secured thereto in any appropriate manner, as by welding. The inner end of the can 32 is received inside the rim portions 28' of reduced thickness and is directed toward the ledges 30, and a sealing ring 38 is compressed between the rim portion 28' and the inner end of the can 32.

The pressure measuring members may be resiliently expandible hollow capsules of more or less conventional construction and generally designated 40. These capsules include a mounting portion generally designated 42 which has a passage 42' therethrough (see Fig. 4) so as to permit the transmission of pressure to the interior of the capsule 40. As here disclosed the mounting portion 42 comprises an externally threaded part 44 threadedly received within the base aperture 4 and a pair of axially spaced flanges 46 of greater diameter than the part 44 and received within the countersink 6, a sealing ring 48 being received between the flanges 46 and compressed between the mounting portion 42 and the inner surface of the countersink 6. After the capsule 40 has been mounted on the base 2 by screwing the part 44 into the base aperture 4 until the flanges 46 and captive sealing ring 48 have entered the countersink 6, the appropriate set screw 18 is tightened to positively retain the capsule 40 in place.

Pressure communication to the interior of the capsule 40 is accomplished via the pressure fitting 10, the passage 8 and the aperture 4, all in the base 2, pressure than passing through the passage 42' of the mounting portion 42 into the capsule 40. Escape of this pressure to the interior of the can 32 is prevented by means of the sealing ring 48. Pressure is communicated to the interior of the can 32 via the pressure fitting 16, the passage 14 and the aperture 12, all in the base 2. This pressure cannot escape from the can 32 because of the action of the sealing ring 38. The differential between the pressure inside and outside of the capsule 40 will determine the degree to which that capsule will be compressed or expanded, that compression or expansion taking place in a direction from right to left as viewed in Fig. 1 and into and out of the plane of the drawings of Figs. 2 and 3.

The outwardly extending end of the capsule 40 is provided with a collar 50 to which an element 52 in the form of a rod is secured, preferably by being threaded into an axial aperture 54 in the collar 50, a set screw 56 being carried by the collar 50 to retain the rod 52 in position. The rod 52 extends out from the capsule 40 in the direction of its movement during expansion and contraction.

A bridging structure generally designated 58 is mounted on the base 2. It comprises a pair of legs 60 the outer surfaces of which are arcuate, those legs fitting inside the base flange 28 and outside the capsule 40 and being secured to the flange 28 by means of screws 62 the heads of which are received within countersinks 64. The legs 60 extend axially beyond the collar 50 at the end of the capsule 40, and they are then connected by a crosspiece 66, here shown as circular in periphery. That crosspiece has an enlarged central opening 68 which is bridged by a narrow plate 70, that plate being mounted on opposed crosspiece portions 66' of reduced thickness by means of screws 72, those screws passing through enlarged apertures 74 in the plate 70, the position of the plate 70 relative to the crosspiece 66 therefore being adjustable within limits. As will be seen particularly from Fig. 3, the plate 70 is narrower than the opening 68 in the crosspiece 66, so that openings of appreciable area are defined on either side thereof. The plate 70, at its center, has a brass mounting ring 76 secured thereto within which apertured jewel 78 of glass or synthetic sapphire is mounted, and the rod 52 passes snugly through and is slidable relative to the jewel 78. Once the plate 70 has been adjustably positioned relative to the crosspiece 66 so that the rod 52 can slide smoothly through the jewel 78 without binding when the capsule 50 contracts or expands, the screws 72 are tightened and the capsule 40 will then be reliably supported at both ends thereof, the jewel 78 serving as a guide to permit movement of the rod 52 only in the direction of its length. In this way the sensitive pressure-measuring component of the instrument is reliably supported and insulated against the effects of vibration, acceleration and shock, and in addition the output of the instrument is rendered more accurate because movement of the capsule 40 during expansion and contraction can only take place in the desired direction.

A yoke generally designated 80 is secured to the collar 50, that yoke having a sleeve 82 which fits over the collar 50 and is secured thereto by means of set screw 84. The sleeve 82 carries a pair of arms 86 which pass through the central opening 68 of the crosspiece 66 to either side of the plate 70, the axially extending ends of the arms 86 being connected by a strap 88 having a central aperture 90 through which the rod 52 freely extends. That portion of the yoke 80 on the other side of the crosspiece 66 from the capsule 40 has secured thereto in any appropriate manner a pair of control elements, here shown as conductive brushes 92 adapted to operatively engage an appropriate electrical component generally designated 93 in order to vary the condition thereof in accordance with the contracted or expanded status of the capsule 40. In the form here specifically disclosed, the electrical components 93 comprise a resistive winding 95 over one edge of which the brush 92 is adapted to wipe, the brush being provided within an indented portion 94 for that purpose, as is conventional.

The bridging structure 58 is provided with a pair of arms 96 which extend from the crosspiece 66 away from the capsule 40. The arms 96 are provided with elongated slots 98 and countersinks 99 which are parallel to the rod 52 and hence parallel to the direction of movement of the brushes 92 when the capsule 40 contracts or expands. A plate 100 is mounted on the inside of the arm 96 and is provided with three apertures 102, 104 and 106, the first of which is internally threaded and the third of which is countersunk at 108. First and second screws 110 and 112 respectively are provided the heads of which are positioned on the outside of the arm 96, washers 114 preferably being interposed between the screw heads and the outer surface of the arm 96. The screws proper pass through the slots 98 and enter the apertures 102 and 104 respectively in the plate 100, the screw 110 being threadedly received in the aperture 102 and screw 112 passing through the aperture 104 and extending therebeyond. A flanged nut 116 is received within the aperture 106 in the plate 100 and extends up therefrom.

An L-shaped bracket generally designated 118 is provided with a supporting portion 120 and a mounting portion 122 at right angles thereto. The supporting portion 120 is positioned on the inner surface of the plate 100, the mounting portion 122 extending therefrom toward the brush 92. The supporting portion 120 is provided with elongated arcuate slot 124 and with an internally threaded aperture 126. The nut 116 on the plate 100 enters the elongated slot 124, and a third screw 128 engages with the nut 116, a washer 130 preferably being provided between the head of the screw 128 and the radially inner surface of the supporting portion 120. The screw 112 is threadedly received within the aperture 126, and constitutes the axis about which the supporting portion 120 may pivot relative to the plate 100.

The mounting portion 122 is provided with a plurality of apertures 132 through which screws 134 may pass so as to mount the resistor winding 95 thereon, that winding being provided with terminals 136.

Since the brushes 94 can move only in one direction, to wit, the direction in which the rod 52 extends, the number of turns of the resistor winding 95 which brush 92 will traverse for a given degree of movement thereof will depend upon the angle which the brush-engaged surface of the winding 95 makes with the direction of movement of the brush 92. That angle will therefore determine the rate of change of the electrical output from the component 93 for a given change in pressure detected by the capsule 40. This angle, and consequently the "rate" of the electrical output, may be adjusted by loosening screws 112 and 128 and then pivoting the bracket 118 about the screw 112 until the desired angle is achieved, after which the screws 112 and 128 are tightened. The position of the plate 100 relative to the fixed arm 96 cannot change during this adjustment because the screw 110 has remained tight. If, for a given position of the brush 92, a variation in the magnitude of the output of the component 93 is desired, the screws 110 and 112 are loosened and the plate 100, together with the bracket 118 and the component 93, may be slid in the direction of the rod 52 and the slot 98 to desired position, after which the screws 110 and 112 are tightened. "Rate" adjustment will not vary, however, because the screw 128 has remained tight.

In order to minimize the effect which rate adjustment might have on zero position, it is preferred that the winding 95 be mounted on the bracket 118 so that a prolongation of the pivotal axis of the bracket 118 defined by the screw 112 will be in the plane of the winding surface engaged by the brush 92. The actual point on the brush-engaged surface through which that pivotal axis passes will therefore retain its same spacing relative to the brush 92 while the rate adjustment is made. For most purposes it is preferred that this point should be approximately midway along the length of the brush-engaging surface of the winding 95.

Leads generally designated 133 (see Fig. 2) extend from the terminals 136 for the winding 95 and the terminals 91 for the brushes 92 through appropriate apertures 137 in the crosspiece 66 and apertures 138 in the base 2 to a passage 140 which communicates with a conventional electrical connector 142.

When, as is here specifically disclosed, a single capsule 40 actuates two sets of indicating means 92, 93, so that two independent electrical outputs can be derived, each with its own zero position and rate, it has been found exceedingly desirable that the sets of indicating means should be diametrically opposed from one another. To state the matter more generally, when a plurality of such means are to be employed, they should be equally angularly distributed about the direction of movement of the brushes 92, or, in terms of the structure here specifically disclosed, about the axis of the rod 52. In this way any tendency of the rod 52 to bend within the jewel 78 is minimized, since the forces acting thereon in one lateral direction or the other are balanced. Moreover, this balance of forces is advantageous in further resisting the effects of vibration, acceleration or shock by tending to provide a restoring force in the event of movement of the operating mechanism in one direction or another. In addition, the contact pressure between the respective brushes 92 and their windings 95 will tend to be equalized and rendered constant, thus eliminating a possible cause of inaccuracy.

The instrument here disclosed is simple, sturdy and inexpensive. It has proved to be exceptionally rugged, and to have a high degree of accuracy even under extremely adverse operating conditions.

While but a single embodiment of the present invention has been here disclosed, it will be apparent that many variations may be made therein, all within the scope of the instant invention as defined in the following claims.

We claim:

1. In a measuring instrument, a base, an expansible member mounted on said base and capable of expanding and contracting in a given direction, an element extending from said member in said given direction and movable therewith as said member expands and contracts, a guide operatively connected to said base and having an aperture through which said element is slidable, spaces being provided on either side of said guide, said element engaging said guide so as to be supported thereby, a yoke carried by and movable with said member and extending around said guide through said spaces, and means carried by said yoke for indicating the position of said yoke relative to said base.

2. In a measuring instrument, a base, an expansible member mounted on said base at one end only of said member and capable of expanding and contracting in a given direction toward and away from said base, an element extending from said member in said given direction and movable therewith as said member expands and contracts, a guide operatively connected to said base and having an aperture through which said element is slidable, spaces being provided on either side of said guide, said element engaging said guide so as to be supported thereby, a yoke carried by and movable with said member and extending around said guide through said spaces, and means carried by said yoke on the side of said guide opposite said member for indicating the position of said yoke relative to said base.

3. The instrument of claim 2, in which said guide is adjustably mounted with respect to said base.

4. The instrument of claim 2, in which said means comprises a control element to make engagement with an electrical component, a support mounted on said base and having a slot extending in said given direction, a plate slidably mounted on said support and having an aperture, a first screw passing through said slot and operatively engaging said support and said plate for fixing their relative positions, a bracket mounted on said plate and having an arcuate slot, a second screw passing through said support slot and said plate aperture and engaging said support and said bracket, said second screw defining an axis about which said bracket pivots, a third screw passing through said arcuate bracket slot and engaging said plate and said bracket for fixing their relative positions, and an electrical component mounted on said bracket and engaged by said control element.

5. The instrument of claim 4, in which said control element slides over the surface of said component, said component being mounted on said bracket so that the axis of said second screw intersects said surface.

6. The instrument of claim 1, in which said guide is adjustably mounted with respect to said base.

7. The instrument of claim 1, in which said means comprises a control element adapted to make engagement with an electrical component, a support mounted on said base and having a slot extending in said given direction, a plate slidably mounted on said support and having an aperture, a first screw passing through said slot and operatively engaging said support and said plate for fixing their relative positions, a bracket mounted on said plate and having an arcuate slot, a second screw passing through said support slot and said plate aperture and engaging said support and said bracket, said second screw defining an axis about which said bracket pivots, a third screw passing through said arcuate bracket slot and engaging said plate and said bracket for fixing their relative positions, and an electrical component mounted on said bracket and engaged by said control element.

8. The instrument of claim 7, in which said control element slides over the surface of said component, said component being mounted on said bracket so that the axis of said second screw intersects said surface.

9. A mounting arrangement for an electrical component comprising a support having a slot, a plate slidably mounted on said support and having an aperture, a first screw passing through said slot and operatively engaging said support and said plate for fixing their relative positions, a bracket mounted on said plate and having an arcuate slot, a second screw passing through said support slot and said plate aperture and operatively engaging said support and said bracket, said second screw defining an axis about which said bracket pivots, a third screw passing through said arcuate bracket slot and operatively engaging said plate and said bracket for fixing their relative positions, and an electrical component mounted on said bracket.

10. The mounting arrangement of claim 9, in which said component is mounted on said bracket so that the axis of said second screw intersects said component.

11. In a measuring instrument, a base, an expansible member mounted on said base at one end only of said member and capable of expanding and contracting in a given direction toward and away from said base, an element extending from said member in said given direction and movable therewith as said member expands and contracts, a guide operatively connected to said base and having an aperture through which said element is slidable, spaces being provided on either side of said guide, said element engaging said guide so as to be supported thereby, a yoke carried by and movable with said member and defining a loop extending around said guide through said spaces, and means carried by said yoke on the side of said guide opposite said member for indicating the position of said yoke relative to said base.

12. The instrumentality of claim 11, in which said guide is adjustably mounted with respect to said base.

13. The instrument of claim 11, in which said means comprises a control element adapted to make engagement with an electrical component, a support mounted on said base and having a slot extending in said given direction, a plate slidably mounted on said support and having an aperture, a first screw passing through said slot and operatively engaging said support and said plate for fixing their relative positions, a bracket mounted on said plate and having an arcuate slot, a second screw passing through said support slot and said plate aperture and engaging said support and said bracket, said second screw defining an axis about which said bracket pivots, a third screw passing through said arcuate bracket slot and engaging said plate and said bracket for fixing their relative positions, and an electrical component mounted on said bracket and engaged by said control element.

14. In a measuring instrument, a base, an expansible member mounted on said base and capable of expanding and contracting in a given direction toward and away from said base, an element extending from said member in said given direction and movable therewith as said member expands and contracts, a structure having legs radially outside said member and secured to said base, and a cross piece between said legs axially beyond said member and having an aperture in line with said element through which said element slides, spaces being provided on either side of said cross piece, said element engaging said cross piece so as to be supported thereby, a yoke carried by and movable with said member and extending around said cross piece through said spaces, and means carried by said yoke for indicating the position of said yoke relative to said base.

15. In the instrument of claim 14, a plurality of arms extending from said crosspiece away from said base, electrical components mounted on said arms, said means comprising a plurality of control elements carried by said yoke on the side of said crosspiece opposite said member and engageable with said electrical components.

16. In the instrument of claim 14, a plurality of arms extending from said crosspiece away from said base, electrical components mounted on said arms, said means comprising a plurality of control elements carried by said yoke on the side of said crosspiece opposite said member and engageable with said electrical components, said arms, components and control elements being uniformly angularly distributed about the axis of said element.

References Cited in the file of this patent

UNITED STATES PATENTS

| | | |
|---|---|---|
| 2,244,958 | Moross | June 10, 1941 |
| 2,443,252 | Kelly | June 15, 1948 |
| 2,485,433 | Crum | Oct. 18, 1949 |
| 2,617,912 | Colvin | Nov. 11, 1952 |
| 2,724,760 | Giannini et al. | Nov. 22, 1955 |